UNITED STATES PATENT OFFICE.

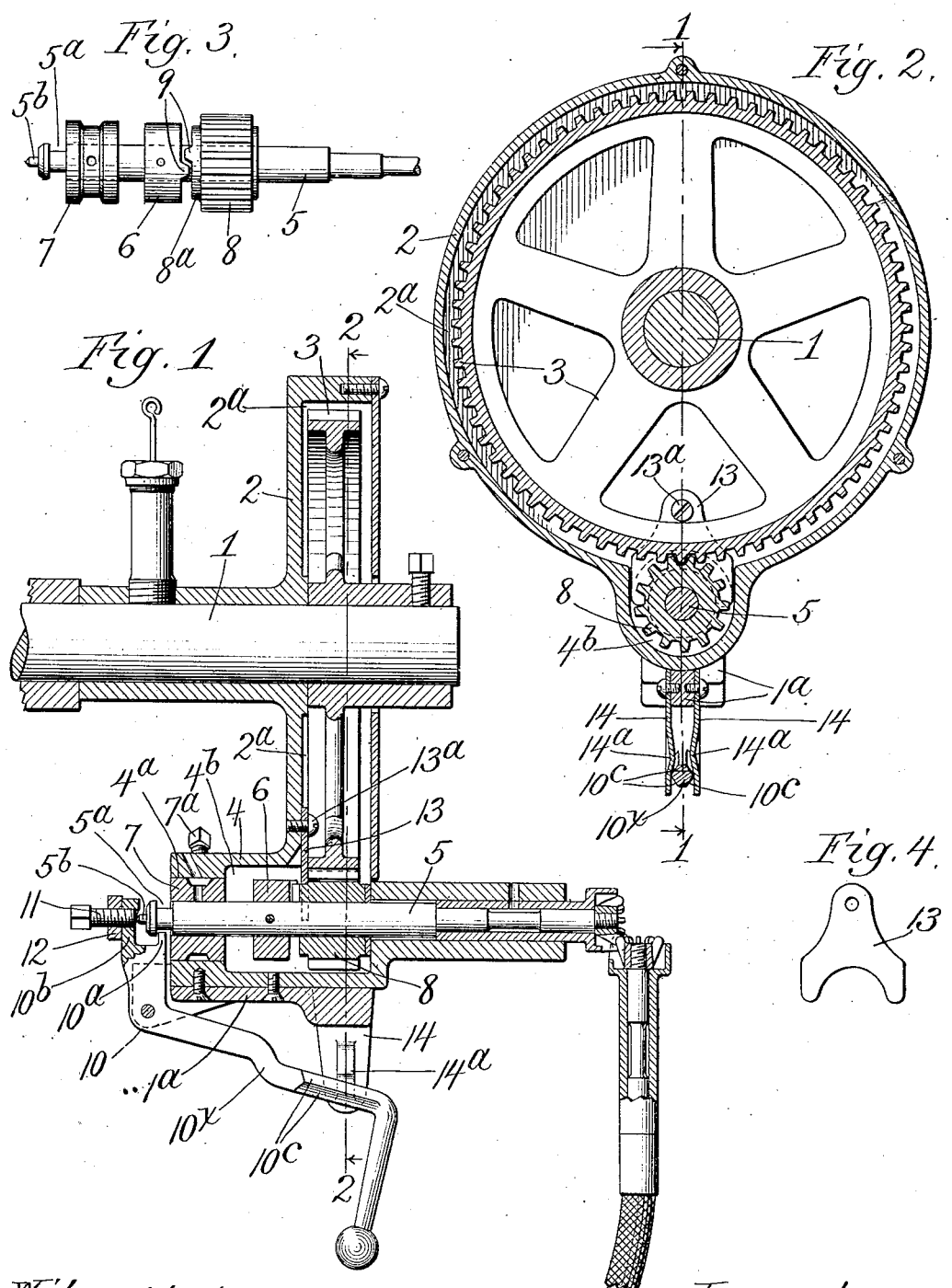

JOHN KERWIN STEWART, OF CHICAGO, ILLINOIS.

DRIVING-CLUTCH FOR POWER TRANSMISSION.

No. 814,093.  Specification of Letters Patent.  Patented March 6, 1906.

Application filed April 10, 1905. Serial No. 254,751.

*To all whom it may concern:*

Be it known that I, JOHN KERWIN STEWART, a citizen of the United States, residing at Chicago, in the county of Cook and State of Illinois, have invented new and useful Improvements in Driving-Clutches for Power Transmission, of which the following is a specification, reference being had to the accompanying drawings, forming a part thereof.

This invention relates to devices for transmitting power from a continuously-revolving shaft, particularly adapted for use in transmitting from such shaft to a plurality of secondary shafts designed for connection with flexible or jointed shafts for operating hand-directed tools whose action it is desirable to be able to interrupt and resume independently of each other.

It consists of the features of construction set out in the claims.

In the drawings, Figure 1 is a section axial with respect to both the driving and driven shafts at the plane of the line 1 1 on Fig. 2 of a device involving my invention. Fig. 2 is a section at the line 2 2 on Fig. 1. Fig. 3 is a detail side elevation of the driven shaft and devices thereon for clutching. Fig. 4 is a detail view of a stop-plate.

The continuously-driven shaft 1 may be understood as mounted in fixed bearings deriving power from any source. (Not shown.) For the purpose of this invention a hanger and gear housing 2 is hung on the shaft 1, on which within the housing there is made fast the power-transmitting gear 3. At the lower side the hanger 2 has a housing 4, containing bearings for a driven shaft 5, on which there is mounted rigidly a clutch member 6.

In order that the shaft may be introduced into the housing with the clutch member 6 rigidly united with it or even integral with it, said housing is bored out at one end, as seen at $4^a$, to the full size of the clutch member 6, and a steel bushing 7 of the size of the bore $4^a$ is provided to follow the clutch member 6 into the bore as the shaft is inserted and constitute a journal-bearing for the shaft, such bushing being secured in position by a screw $7^a$. Said housing 4 is further chambered out at $4^b$ to accommodate a pinion 8, and said chamber $4^b$ opens into the chamber $2^a$, in which the gear 3 is accommodated, the opening being of the full width of the smaller chamber $4^b$, so that the pinion 8 can be introduced edgewise through the chamber $2^a$ into the chamber $4^b$ before the shaft 5 is inserted into the housing 4, and the shaft is then inserted through the pinion.

The pinion at the side toward the bore $4^a$ is formed to constitute or has rigid with it a clutch member $8^a$. The clutch members 6 and $8^a$ are adapted for clutching by having each of them a single tooth 9, and the shaft is designed to be longitudinally moved in its bearings for engaging and disengaging these teeth. For the purpose of thus adjusting the shaft into and out of driving relation it is provided back of the end which protrudes from the journal-bearing 7—that is, at the larger end of the housing 4—with an annular groove $5^a$, and at the end it is provided with a taper-pointed axially-protruding stud or pin $5^b$. In a bracket $1^a$, formed or mounted at the upper side of the bearing 4 and projecting beyond the larger end thereof, there is fulcrumed a bell-crank lever 10, which has its shorter arm projecting transversely with respect to the shaft 5 and provided with a finger or lip $10^a$, which engages the annular groove $5^a$ of the shaft 5. Another finger $10^b$ of the same arm of the bell-crank lever projects past the end of the shaft and past the end of the stud $5^b$, which terminates the shaft, and through this finger $10^b$ there is set a bolt 11, whose inner end stands in position to encounter the end of the stud $5^b$, and this bolt is adjustable by screwing through the finger and is provided with a lock-nut 12 for securing it at proper position. The lip or finger $10^a$ of the bell-crank lever engaging the groove $5^a$ would suffice not only to move the shaft longitudinally in either direction but also to hold it in position for driving engagement of the clutch members; but the friction which would be caused between the side of said lip $10^a$ against the side of the groove $5^a$ would be objectionable, and the end thrust, therefore, of the shaft when the clutch is engaged for driving it is taken by the taper-pointed stud $5^b$ against the end of the bolt 11, thus reducing the friction due to this end thrust to minimum.

The pinion 8 is stopped against longitudinal displacement in one direction by the inner end of the chamber $4^b$; but said chamber being necessarily extended to accommodate not only the pinion, but also the clutch member 6 and the full range of movement of said clutch member into and out of engaging position, other means must be provided for stopping the pinion against movement toward that clutch member—that is, to prevent it from following the clutch member in its movements and so being kept engaged therewith. For the purpose of thus stopping the pinion in that direction there is provided a stop-plate 13, which is inserted from within the housing $2^a$ of the large gear 3, and being provided at its inner end with a semicircular recess or notch adapted to embrace or stride the clutch member $8^a$ of the pinion it bears laterally against the gear-rim of the pinion outside said clutch member, and so checks any tendency to longitudinal movement in that direction. A single screw $13^a$ secures the stop-plate, which is prevented from turning so as to be displaced not only by the fact that it strides the clutch member, as stated, but also by the sides of the chamber $4^b$, between which it enters to stride the clutch.

For holding the bell-crank lever 10 in either position to which it may be set for engaging or disengaging the clutch the longer arm $10^x$, which extends approximately parallel to the bearing 4 below the same, is provided with oppositely-projecting angles $10^c$ $10^c$ and is embraced at the point at which these angles are formed between two spring-plates 14 14, secured to the bracket $1^a$, said spring-plates being indented from without inward to form obtuse-angled protrusions $14^a$ $14^a$ at directly opposite positions, past which the angles $10^c$ of the lever-arm must move when the lever is rocked from one position to the other.

The resistance of the springs serves to check the lever against moving in either direction, so as to carry the angles $10^c$ past the protrusions $14^a$ of the springs and also has the effect to insure full movement of the lever whenever any movement is made, because the operator must use considerable pressure to force the angles $10^c$ past the spring-bosses $14^a$. The rapid diminution of the resistance which occurs as soon as the crest of the angles is past will cause the force applied by the hand of the operator, and which cannot be instantly arrested, to drive the lever to the limit in the direction in which it is being pushed.

A special feature of this clutch and its controlling device, which will now be described, has the purpose of causing the clutch to be disengaged whenever the resistance of the work exceeds a certain amount which may be considered the limit of safety, as where a tool which may be operated by connection with the shaft 5 becomes snagged or engaged with some substance which would break the tool if its motion should be forced. In such event the driving power should be automatically disengaged, so that the tool being stopped the operator may remove the obstruction. It is not sufficient that there should be mere slipping of the driving connections with reëngagement or with a continuous driving-pressure merely insufficient to overcome the obstacle, because in such case the continued strain will be liable eventually to break the tool or distort it, and the operator would be prevented from relieving the tool of the obstruction while the pressure of the power was operating upon it, even though insufficiently to drive it. The expedient for accomplishing the purpose of causing automatic disengagement of the driving-power in such cases consists, first, in making the engaging shoulders of the clutch-teeth 9 sloping at an angle, which according to experience with the particular kind of work to which the device is to be applied will cause the teeth to ride up upon each other and become disengaged when the resistance reaches the safety limit. If the shaft 5 were merely held elastically in the direction for engagement of the clutch, such disengagement, as above described, would merely carry the teeth past each other and cause the shaft to come back into position for engagement at the next revolution, so that there would be a constantly-recurring blow at each revolution when the sloping shoulders of the teeth came together, which would be even more likely to break the tool than the steady driving-pressure. In order, therefore, that the crowding apart of the clutch members by the slopes of their coöperating teeth under such circumstances shall not merely cause them to pass at that revolution, but to remain separated, so that they will not reëngage at the next revolution, the angles $10^c$, bell-crank lever 10, and angular protrusions $14^a$ of the springs 14 are relatively located, so that the movement of the shaft 5 endwise to the distance to which it will be forced by the climbing of the sloping teeth one upon the other, carries the angles $10^c$ past the crest of the protrusions $14^a$, so that return of the lever in the opposite direction is prevented, and the shaft is thereby held at the extreme position to which it is forced in the escape of the teeth past each other, and the power remains shut off from the shaft 5 until the obstruction or other difficulty being removed, the operator moves the lever in direction for engaging the clutch.

I claim—

1. In combination with a shaft-hanger having a shaft journaled therein; a pinion loose on the shaft and stopped independently of the latter against endwise movement in either direction; a clutch member on the pinion and a companion clutch member fast on the shaft, said clutch members having corresponding sloping shoulders for engagement with each other, the shaft being longitudinally movable in its bearings; a lever mounted on the bearing and connected with the shaft for receiving and transmitting such longitudinal movement, and means on the bearing for holding the lever at the position to which it is moved by the longitudinal movement of the shaft.

2. In combination with a hanger, a shaft journaled therein; a pinion loose on the shaft and means independent of the shaft for stopping it against endwise movement; coöperating clutch members on the pinion and shaft respectively having sloping shoulders for driving engagement with each other, the shaft being movable longitudinally in the bearings, and means for holding it yieldingly at the position to which it is thus moved.

3. In combination with a hanger, a shaft journaled therein; a pinion loose on the shaft and stopped independently of the shaft against endwise movement; coöperating clutch members on the pinion and shaft respectively having sloping shoulders for driving engagement with each other, the shaft being movable longitudinally in the bearings; a lever fulcrumed on the bearing and engaging the shaft for giving it longitudinal movement, and a spring-plate along which the lever moves, said plate having an angular upraise protruding toward the lever, the lever having the side toward the plate formed with an angle for encountering said angular upraise.

4. In combination with a hanger, a shaft journaled therein; a pinion loose on the shaft and stopped independently of the shaft against endwise movement; coöperating clutch members on the pinion and shaft, the shaft being movable longitudinally in its bearings and having an annular groove near the end; a lever fulcrumed on the bearing having a finger which takes into the annular groove of the shaft, and having a second finger which projects past the end of the shaft, and a taper-pointed screw set through the last-mentioned finger for bearing against the end of the shaft in the movement of the shaft which brings the clutch members into engagement.

In testimony whereof I have hereunto set my hand, in the presence of two witnesses, at Chicago, Illinois, this 15th day of March, A. D. 1905.

JOHN KERWIN STEWART.

Witnesses:
CHAS. S. BURTON,
J. S. ABBOTT.